May 28, 1963          B. S. WILLIAMS          3,091,288

HIGH PRESSURE AIR CONDITIONING SYSTEM

Filed Feb. 16, 1960          2 Sheets-Sheet 2

INVENTOR.
BURDELL S. WILLIAMS

BY

ATTORNEYS

United States Patent Office 3,091,288
Patented May 28, 1963

3,091,288
HIGH PRESSURE AIR CONDITIONING SYSTEM
Burdell S. Williams, Larchmont, N.Y., assignor to Hi-Press Air Conditioning of America, Inc., New York, N.Y.
Filed Feb. 16, 1960, Ser. No. 9,069
6 Claims. (Cl. 165—48)

This invention relates to central station air conditioning systems and, more particularly to a compact and efficient air conditioning design for quiet operation at higher than conventional pressures.

In general, central station air conditioning systems of the usual type supply conditioned air at pressures of approximately four inches water gauge. Consequently, in order to deliver sufficient air to control the temperature of a large space, specially designed sheet metal ducts of substantial cross-sectional area are required and because of their flexibility these ducts require considerable sound deadening treatment which affects the rate of air flow. Although some rigid ducts in the form of pipes, for example, have been proposed heretofore as a means for carrying conditioned air, until now no central station air conditioning plant has supplied air at high enough pressure to produce the desired flow rates.

Moreover, most present central air conditioning plants are bulky and generate substantial noise and, therefore, they must be located in isolated areas. Also, because of their bulk, central plants of conventional design cannot be fabricated at the factory and shipped in simple, easily-assembled units for installation but must be fabricated completely when they are installed. As a result, it is impractical to test the operation of conventional systems prior to installation and frequently a substantial amount of revision is necessary after the installation of such systems. Furthermore, many of the presently known central plant air conditioning systems merely provide cool air in varying quantities according to need and no provision is made for controlling the temperature of the air delivered.

Accordingly, it is an object of the present invention to provide a new and improved central station air conditioning system supplying air at higher than conventional pressures.

Another object of the invention is to supply a central station air conditioning system characterized by its quiet operation and compact arrangement.

A further object of the invention is to provide a system of the above character comprised of a minimum number of readily assembled units which can be prefabricated and tested prior to installation.

Still another object of the invention is to provide an air conditioning system capable of controlling the temperature of the air delivered.

These and other objects of the invention are attained by providing a plurality of unitary sections each incorporating selected components of an air conditioning plant and having mating air outlet and inlet openings, the various sections being adapted to form a ductless, compact unit with tightly sealed joints when assembled. Preferably, each of the sections is boxlike in shape and one section contains the fan and drive motor while a second section comprises a sound absorbing and air distributing unit. Still another section includes cooling coils and a fourth section holds refrigerating equipment, the various sections being arranged so that all can be joined into a compact, relatively small structure. To accomplish an airtight seal between two adjacent sections at least one of the sections has a rigid L-shaped member surrounding its opening and a resilient gasket, preferably of triangular cross-section, is mounted in the internal corner of the L-shaped member so as to be compressed by a mating portion of the adjacent section.

In addition, the fan and its drive motor are mounted on a single support member which may be supported on an isolation mount of unique design embodying at least two vibration-absorbing layers on opposite sides of the member, and this is located at the intake end of the system. Air delivered from the fan section is directed to a sound absorbing and air distributing section wherein a plurality of planar, sound-deadening baffle elements distribute the air over the entire length of the unit while, at the same time, eliminating substantially all the noise carried by the driven air. In particular, the baffles guide the driven air through at least three successive 90° turns while gradually increasing the size of the flow passage so that the air is distributed and noise is eliminated without producing the turbulence which results from an angled baffle structure.

Furthermore, the system of the invention contemplates the utilization of at least two separate cooling units, mounted in another separable section, which may be controlled independently or connected in series or in parallel. Also, at least one heating unit may be included in a separate compartment in this section to provide control over the temperature of the air delivered, separate outlets being provided for warm and cool air. If desired, the air may be passed through a preheating unit prior to cooling and, to prevent radiant heat from passing directly to a cooling unit, heat-insulating baffles are interposed between the heating and cooling units.

Further objects and advantages of the invention will be apparent from a reading of the following description in conjunction with the accompanying drawings in which.

Figure 2:
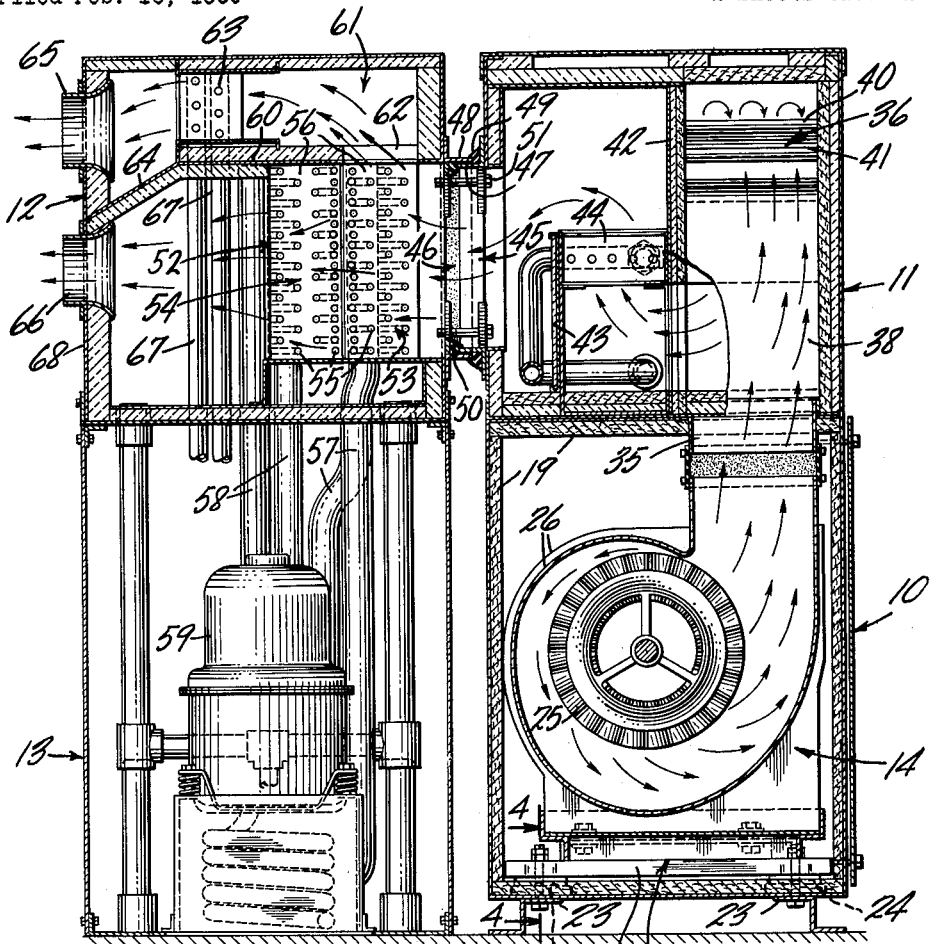
FIG. 2 is a sectional view taken along the line 2—2 of FIG. 1 illustrating the compact arrangement of the four sections of the air conditioning unit.

As best seen in the cross-sectional view of FIG. 2, the typical embodiment of a central station air conditioning plant shown in the drawings comprises four boxlike sections 10, 11, 12, and 13 which are separably joined in a compact arrangement for operation, each of the sections containing selected components of the system. By virtue of this unique arrangement a compact plant capable of delivering air at velocities up to 6,000 feet per minute at 13" water gauge pressure, for example, can be assembled easily in the field from a minimum number of units, none of which has a cross-section greater than about two and one-half feet by three and-one half feet. This permits the equipment to be shipped in separate sections each of which will pass through a small opening and then these are bolted together without requiring highly skilled labor. Moreover, each of the sections can be separately tested at the factory in its final form prior to shipping and installation.

In the section identified by the reference numeral 10 a centrifugal fan 14 of the usual type driven by an electric motor 15 draws air from the surrounding atmosphere through conventional dust filters 16 and through an air intake opening 17 at one end of the section. In order to prevent noise from the fan and motor from radiating out of the fan unit, the unit is lined with a layer of the usual sound-absorbing material 19 and baffles 20 made of the same material are interposed between the filter 16 and the fan.

Moreover, instead of mounting the fan and drive motor separately, as is done in most conventional plants, both these units are mounted on the same support member 21 consisting of a pair of support channels 22 connected to the base 23 of the fan section through special isolation mounts 24. As a result, the fan impeller 25 can be supported within the fan housing 26 with a very close spacing between the two, thereby eliminating pressure losses within the fan in contrast to the large spacing required to prevent contact when the fan and motor are mounted separately and the consequent high pressure losses.

Figure 4:
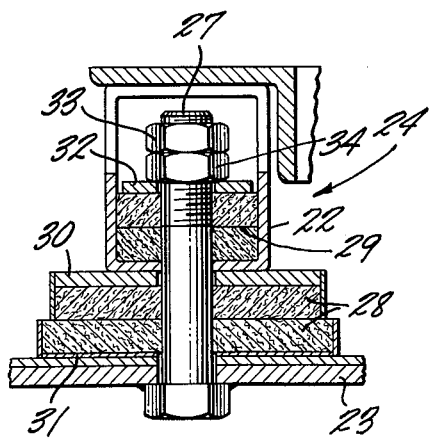
FIG. 4 is an enlarged sectional view of the isolation mount for the fan unit shown in FIG. 1.

As best seen in FIG. 4, each of the isolation mounts 24 used in the present invention comprises a central bolt 27 welded at one end to the base member 23 and passing through a hole in the bottom of the channel member 22. Surrounding this bolt a layer 28 of vibration-absorbing material is interposed between the channel member 22 and the base 23 while a second layer 29 of vibration-absorbing material surrounds the portion of the bolt 27 above the channel member. In addition, a steel washer 30 separates the bottom of the channel from the layer 28, while another washer 31 is positioned beneath the layer 28 and a third washer 32 is located between the layer 29 and two jam nuts 33 and 34 threaded on the upper end of the bolt. If desired, the periphery of each of the vibration-absorbing layers may be surrounded by a metal ring to prevent deformation of the vibration-absorbing material, the layer 29 being square to fit within the channel while the layer 28 is of circular shape.

Figure 1:
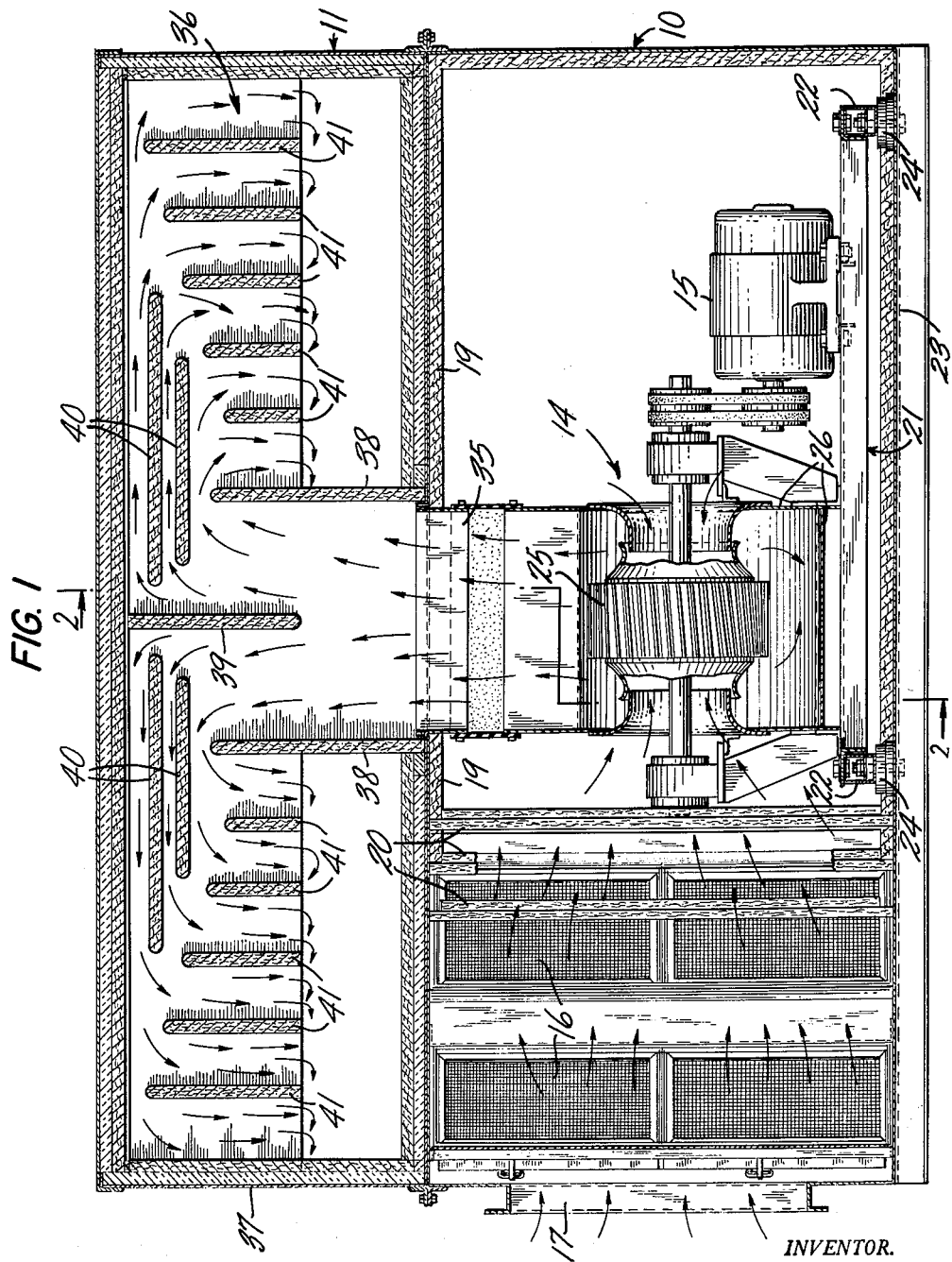
FIG. 1 is a view in elevation, partly broken away, showing one side of a typical central station air conditioning plant according to the invention.

Air from the fan 14 is delivered by an outlet duct 35 of the usual type having substantially the same width as the fan housing and, in order to prevent channeling of air through only the central portion of the cooling unit described hereinafter, the sound-absorbing unit 11 is arranged in a unique manner to distribute the air evenly over the entire width of the plant. For this purpose the sound-absorbing unit includes a distributing compartment 36 which, as best seen in FIG. 1, includes a plurality of planar baffle elements made of sound-deadening material and arranged to spread the air across the width of the compartment without turbulence while, at the same time, reducing the flow rate by a factor of about six, the entire unit being enclosed in an airtight housing 37.

To accomplish this, two panels 38 form an intake passage having approximately the same size as the duct 35 and a divider 39 extending from the top of the compartment splits the air in this passage into two paths, one directed toward each end of the compartment and each path being approximately the same size as the intake passage. On each side of the divider 39 two spaced horizontal planar baffles 40 divide the air path into three horizontal portions whereby air is directed to the outer portion, the central portion, and the inner portion of each half of the compartment, respectively. Five vertical baffles 41 on each side then direct the air downwardly to the lower portion of the compartment. With a planar baffle arrangement of this type wherein the baffles are separated by open spaces, pressures are equalized throughout the compartment so as to spread the air evenly across the entire width without turbulence.

As best seen in FIG. 2, air from the bottom of the compartment passes beneath a vertical divider 42 forming the rear wall of the compartment and is then directed upwardly by another divider 43 extending upwardly from the bottom of the unit. Near the top of this divider a heating unit 44 is positioned to intercept all the air passing between the two dividers. In the side wall of the sound-absorbing section 11 which is adjacent to the cooling section 12, a large opening 45 extending substantially the entire width and height of the section forms an outlet for the air at right angles to the direction through the heating unit. Thus, it will be noted that air is directed through five consecutive 90° turns while passing through the sound-absorbing chamber, thus completely blocking any noise originating in the fan section. The divider 43 is made of heat insulating material and the heating unit, which may be of any conventional type and typically comprises a hot water coil with radiating fins, is located far enough below the top of this divider so that no radiant heat from the heater can pass through the opening 45 into the cooling section.

Figure 3:
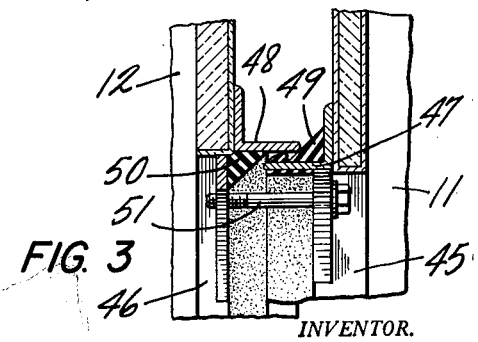
FIG. 3 is an enlarged fragmentary view illustrating the coupling of two of the sections shown in FIG. 2.

In order to form an airtight seal between the outlet opening 45 and an inlet opening 46 of the same size in the cooling unit, rigid L-shaped members such as standard two inch angle irons 47 and 48 are mounted about the peripheries of two openings. As best seen in the enlarged sectional view of FIG. 3, rubber gaskets 49 and 50 of triangular cross-section are mounted in the inner corner of the member 48 and along the base of the outer edge of the member 47 and the L-shaped members are slightly displaced, by one-quarter inch for example, so that the projecting leg of each member will engage and compress the gasket in the other member as the two units are brought together. With this arrangement only four bolts 51, one at each corner of the openings, are required to connect and retain the two sections 11 and 12 in airtight engagement even though the openings 45 and 46 may be as large as six feet by fifteen inches. Also, since the gap between the angle irons 47 and 48 can be a quarter inch or more, no accurate machined fittings are necessary to join the two sections. Moreover, even if only a single gasket 49 is used, a secure airtight seal can be formed since air pressure from within the sections tends to deform the gasket so as to press it tightly against both the angle irons in the space between the two.

In the cooling section 12 of the air conditioning plant a cooling unit 52 comprises two adjacent coil sections 53 and 54 which are mounted at the inlet opening 46, the coil 53 being adjacent to the opening and the coil 54 being next to the coil 53. Each of these two coils is arranged in the usual manner to circulate chilled water or other refrigerant through tubing 55 to which a series of vertical fins 56 is joined. Because of the vertical orientation of the fins 56 at the opening 46, any non-uniformity of air distribution in the vertical direction as the air passes into the cooling unit 12 is rapidly eliminated so that the air is spread out uniformly over the entire height and width of the cooling unit, the lateral distribution having been accomplished in the sound-absorbing section 11 as described above.

Each of the cooling coils 53 and 54 is separately connected through pipes 57 and 58 to a condensing unit 59 mounted in the fourth section 13 and the temperature of the refrigerant passing through these coils preferably is controlled separately so that the coil 54 is cooler than the coil 53. In this way, relatively gradual cooling of the air is accomplished and maximum water condensation takes place. If desired, however, the two coils 53 and 54 may be connected in series so that refrigerant from the condenser unit 59 passes into the coil 54 and returns from the coil 53.

Preferably, the fins 56 of the second coil 54 are somewhat less closely spaced than those in the coil 53 to provide a slight decrease in air pressure and reduced flow resistance. Also, it will be understood that additional coils can be included within the unit as needed and these may be under separate temperature control or connected in series or in parallel to the coils 53 and 54.

Above the cooling coils 56 and 57 a horizontal divider 60 made of heat insulating material forms an upper compartment 61 and has an opening 62 to permit air to move upwardly from the first cooling coil into the compartment 61. At a position spaced from the opening 62 a reheating coil 63 is mounted so that no radiant heat therefrom can pass through the opening and fall on the cooling coils 53 and 54. The reheating coil 63, which may be connected through a pipe 67 to the heat exhaust section of the condenser unit 59 or to a separate heater in the compartment 13, intercepts all the air passing through the opening 62 and thereafter the heated air is directed by a heatproof partition 64 to a horizontal series of outlet ports 65, only one of which is visible in FIG. 2. The partition 64 is directed downwardly so as to deflect the air from the cooling coil downwardly toward a drain pan at the bottom of the section. As a result, condensed moisture carried by the air is driven down the drain pan rather than being forced out of the cool air outlet ports. Similarly, the cool air from the coils 53 and 54 is directed by the same partition to another horizontal series of outlet ports 66, the entire cooling unit 12 being enclosed in an airtight sheet metal housing 68. As illustrated in the drawings, the outlet ports 65 and 66 are adapted to be connected to conventional rigid piping to carry hot and cold air respectively at high pressure to outlet units (not shown) at the various locations where conditioned air is desired, each outlet unit preferably being the type wherein the air temperature is controlled by selective mixing of hot and cold air.

In operation, sections 10, 11, 12, and 13, which have been previously assembled and tested at the factory, are rigidly joined into a compact unit by a few bolts such as the bolts 51 shown in FIGS. 1 and 2, the gasket 50 being effective to form an airtight seal. Preferably the jam nuts 33 and 34 in each isolation mount 24 are turned to tighten the base 23 and the channel 22 together for shipment but even if these nuts are in their normal position the fan unit 10 can be shipped without timber bracing. Also, because the fan and drive motor are mounted as a unit, if the nuts are tightened for shipment no damage can occur even if the motor is inadvertently operated before the nuts are loosened.

It will be noted that the entire weight of the fan and motor is supported by the felt pads 28 within the four isolation mounts 24 and any tightening of the nuts 33 and 34 compresses these pads so as to limit the possible motion between the base 23 and the channel 22. Inasmuch as the felt pads 29 are interposed between the nuts and the channel member 22 the nuts must be tightened appreciably to reduce the motion of the channel with respect to the base by a small amount. As a result, precise adjustment of the isolation mounts to eliminate all vibrations and, at the same time, restrict the motion of the fan with respect to the base 23 to a desired amount is possible.

When the motor 15 is energized, the fan 14 drives air through the duct 35 into the passageway between the two dividers 38 of the sound-absorbing section 11. The divider 39 splits the air into two paths and the horizontal baffles 40 on each side of this divider guide the air toward the outer ends of the section. From the upper portion of the compartment the air is guided downwardly by the vertical baffles 41 to the lower portion of the section where it passes under the divider 42 and then upwardly through the preheat coil 44 which, if desired, may be connected to the condenser unit 59 or to any source of hot water or other heated fluid. The preheater in combination with the heat of compression generated in the fan unit raises the air temperature sufficiently to prevent appreciable water condensation which might result from the cooling effect of the expansion of the air as it is distributed across the width of the section.

After passing through the joined openings 45 and 46, the air is cooled by the cooling coils 53 and 54 and a portion of the air passes from the first cooling coil 53 into the compartment 61 and then through the reheating coil 63 to the outlet ports 65. The remainder of the air passes through the second cooling coil 54 to the outlet ports 66.

With this arrangement, properly conditioned air can be supplied in accordance with the requirements at any time of the year. In summer, for example, when the demand is for air considerably cooler than the atmosphere, refrigerant is circulated through both the cooling coils 53 and 54 and the reheater coil may be supplied with moderately warm water heated by the exhaust from the condenser unit. As a result, when air from both outlet ports is mixed and circulated in the conditioned area, it is appreciably cooler than the atmosphere but by varying the proportion of warm and cold air, the temperature of the area can be controlled over a wide range. In cooler weather, when the demand for cooling may occur only occasionally, as when the area is crowded with people for example, the first cooling coil 53 may be disconnected from the condenser unit 59 and hot liquid may be circulated through the reheating coil 63. This provides a warmer supply of air through each outlet but, at the same time, permits a wide variation in the temperature of the air delivered by selective mixing of air from the two outlets. In winter, the coils 44 and 63 can be supplied with steam or any other heating medium, thereby satisfying the entire heating requirements under any temperature condition. Moreover, by reason of the fact that the fan 14 is at the intake end of the plant and the cooling takes place subsequent to compression of the air, accurate control of the temperature in the conditioned area is possible since no heat of compression is added subsequent to cooling as in most conventional units.

Although the invention has been described herein with reference to a specific embodiment, many modifications and variations therein will readily occur to those skilled in the art. For example, in marine installations where it may be necessary to pass the air through both the cooling coils 53 and 54 to remove water vapor, the air can be supplied to the heating compartment 61 through openings at opposite ends communicating with the outlet portion of the cooling compartment, rather than through the opening 62. Accordingly, all such modifications and variations are included within the intended scope of the invention as defined by the following claims.

I claim:

1. A high pressure air conditioning system comprising a plurality of separable sections each including an airtight housing and selected components of the system mounted within the housing, means for securing the sections in closely adjacent relation to form a compact unit, fan means mounted within a first section having an outlet duct leading to a second, adjacent section to supply air at high pressure thereto, divider means in the second section forming a central passage to receive air from the fan duct, sound absorbing baffle means disposed within the second section to distribute the air from the central passage uniformly over the entire width of the section, means forming corresponding openings in the second and third section housings extending substantially the entire width of the sections, sealed passage means connecting the openings in the second and third section housings, cooling coil means in the third section having at least one coil intercepting all the air passing through the passage means, said cooling coil means having vertical fin members to permit equalization of air pressures throughout the height of the opening and comprising at least two cooling coils, the first of the cooling coils being adjacent to and covering substantially the entire opening and the second cooling coil being adjacent to the first cooling coil, means for controlling the two cooling coils independently, high pressure air outlet means from the third section adapted to be connected to high pressure piping, said high pressure outlet means including at least two outlet ports and heat insulating divider means extending across the width and length of the third section forming a compartment spaced from the opening in the third section housing and having an opening communicating with the first coil of the cooling coil means, heating coil means within the compartment intercepting the flow of air therethrough, at least one of the outlet ports providing an outlet for warm air from the compartment and at least one other outlet port providing a simultaneous outlet for cool air after passing through the second cooling coil of the cooling coil means, wherein the sealed passage means comprises two L-shaped members, each having one leg parallel to and affixed to the outer surface of the housing wall about the periphery of one of the openings and having another leg projecting perpendicularly outwardly from the outer surface, which leg is slightly displaced laterally from the corresponding leg of the member at the periphery of the other opening, and a compressible gasket within the inner corner of at least one of the members adapted to be compressed by the outer edge of the projecting leg of the other member.

2. A high pressure air conditioning system comprising a plurality of separable sections each including an airtight housing and selected components of the system mounted within the housing, means for securing the sections in closely adjacent relation to form a compact unit, fan means mounted within a first section having an outlet duct leading to a second, adjacent section to supply air at high pressure thereto, divider means in the second section forming a central passage to receive air from the fan duct, sound absorbing baffle means disposed within the second section to distribute the air from the central passage uniformly over the entire width of the section, means forming corresponding openings in the second and third section housings extending substantially the entire width of the sections, sealed passage means connecting the openings in the second and third section housings, cooling coil means in the third section having at least one coil intercepting all the air passing through the passage means, said cooling coil means having vertical fin members to permit equalization of air pressures throughout the height of the opening and comprising at least two cooling coils, the first of the cooling coils being adjacent to and covering substantially the entire opening and the second cooling coil being adjacent to the first cooling coil, means for controlling the two cooling coils independently, high pressure air outlet means from the third section adapted to be connected to high pressure piping, said high pressure outlet means including at least two outlet ports and heat insulating divider means extending across the width and length of the third section forming a compartment spaced from the opening in the third section housing and having an opening communicating with the first coil of the cooling coil means, heating coil means within the compartment intercepting the flow of air therethrough, at least one of the outlet ports providing an outlet for warm air from the compartment and at least one other outlet port providing a simultaneous outlet for cool air after passing through the second cooling coil of the cooling coil means, wherein the baffle means comprises a plurality of planar horizontal baffles on each side of the central passage extending substantially perpendicularly thereto and another plurality of planar vertical baffles extending substantially perpendicularly to the horizontal baffles and spaced laterally from the central passage so as to direct air from the central passage in two successive right angle turns.

3. A high pressure air conditioning system according to claim 2 including two horizontally spaced vertical dividers extending substantially perpendicularly to the baffle means from the top and bottom of the second section, respectively, directing air from the baffle means in at least two more successive right angle turns, and heating coil means disposed between the two dividers to preheat the air in the second section sufficiently to prevent condensation therein resulting from cooling by expansion.

4. A high pressure air conditioning system comprising a plurality of separable sections each including an airtight housing and selected components of the system mounted within the housing, means for securing the sections in closely adjacent relation to form a compact unit, fan means mounted within a first section having an outlet duct leading to a second, adjacent section to supply air at high pressure thereto, divider means in the second section forming a central passage to receive air from the fan duct, sound absorbing baffle means disposed within the second section to distribute the air from the central passage uniformly over the entire width of the section, means forming corresponding openings in the second and third section housings extending substantially the entire width of the sections, sealed passage means connecting the openings in the second and third section housings, cooling coil means in the third section having at least one coil intercepting all the air passing through the passage means, said cooling coil means having vertical fin members to permit equalization of air pressures throughout the height of the opening and comprising at least two cooling coils, the first of the cooling coils being adjacent to and covering substantially the entire opening and the second cooling coil being adjacent to the first cooling coil, means for controlling the two cooling coils independently, high pressure air outlet means from the third section adapted to be connected to high pressure piping, said high pressure outlet means including at least two outlet ports and heat insulating divider means extending across the width and length of the third section forming a compartment spaced from the opening in the third section housing and having an opening communicating with the first coil of the cooling coil means, heating coil means within the compartment intercepting the flow of air therethrough, at least one of the outlet ports providing an outlet for warm air from the compartment and at least one other outlet port providing a simultaneous outlet for cool air after passing through the second cooling coil of the cooling coil means, wherein the fan means in the first section comprises a drive motor, a fan housing, an impeller within the housing driven by the drive motor, fan support means having the fan housing and the drive motor directly mounted thereon, flexible connecting means in the outlet duct of the fan housing leading to the second section, and a plurality of isolation mount means connecting the first section housing and the fan support means whereby the impeller and the fan housing can be supported in closely spaced relation.

5. A high pressure air conditioning system according to claim 2 including a fourth section mounted adjacent to the first and third sections including refrigeration means, and pipe means connecting the refrigeration means to the first and second cooling coils respectively.

6. A high pressure air conditioning system according to claim 5 wherein the heating coil means is connected to supply heat from an exhaust portion of the refrigeration means.

References Cited in the file of this patent

UNITED STATES PATENTS

| | | |
|---|---|---|
| 714,476 | Grubbs | Nov. 25, 1902 |
| 902,897 | McCloskey | Nov. 3, 1908 |
| 1,257,785 | Benzinger | Feb. 26, 1918 |
| 1,389,542 | Wereley | Aug. 30, 1921 |
| 1,685,778 | Heideman | Oct. 2, 1928 |
| 1,938,801 | Bourne et al. | Dec. 12, 1933 |
| 2,186,145 | Perham | Jan. 9, 1940 |
| 2,220,594 | Young et al. | Nov. 5, 1940 |
| 2,338,382 | Marlow | Jan. 4, 1944 |
| 2,828,980 | Craig et al. | Apr. 1, 1958 |
| 2,899,180 | Allander et al. | Aug. 11, 1959 |
| 2,932,956 | Chieregatti | Apr. 19, 1960 |
| 3,012,762 | Norris | Dec. 12, 1961 |

FOREIGN PATENTS

| | | |
|---|---|---|
| 494,851 | Great Britain | Nov. 2, 1938 |